United States Patent
Kang et al.

(10) Patent No.: US 11,623,304 B2
(45) Date of Patent: Apr. 11, 2023

(54) IRREGULARLY-SHAPED DISPLAY PANEL AND CUTTING METHOD

(71) Applicant: Xiamen Tianma Micro-Electronics Co., Ltd., Xiamen (CN)

(72) Inventors: Jiansong Kang, Xiamen (CN); Ping-Chung Yen, Xiamen (CN); Jianan Wang, Xiamen (CN); Tian Luo, Xiamen (CN); Tsung-Han Tsai, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 365 days.

(21) Appl. No.: 16/544,419

(22) Filed: Aug. 19, 2019

(65) Prior Publication Data

US 2020/0070285 A1 Mar. 5, 2020

(30) Foreign Application Priority Data

Aug. 29, 2018 (CN) .......................... 201810994246.3

(51) Int. Cl.
*B23K 26/38* (2014.01)
*B23K 101/36* (2006.01)

(52) U.S. Cl.
CPC .......... *B23K 26/38* (2013.01); *B23K 2101/36* (2018.08)

(58) Field of Classification Search
CPC ................ B23K 26/36; B23K 2101/36; G02F 1/133351
See application file for complete search history.

(56) References Cited

U.S. PATENT DOCUMENTS

| 2017/0275197 A1* | 9/2017 | Altman | C03B 33/04 |
| 2019/0181387 A1* | 6/2019 | Go | H01L 51/0023 |
| 2019/0369667 A1* | 12/2019 | Yug | H01L 51/0097 |
| 2020/0142446 A1* | 5/2020 | Lai | G06F 1/1652 |

FOREIGN PATENT DOCUMENTS

CN 105189022 B 9/2017

OTHER PUBLICATIONS

Wikipedia, "Rectangle" via https://web.archive.org/web/20170304083033/https://en.wikipedia.org/wiki/Rectangle ; pp. 1-6 (Year: 2017).*

* cited by examiner

*Primary Examiner* — Binh X Tran
(74) *Attorney, Agent, or Firm* — Anova Law Group PLLC

(57) ABSTRACT

Irregularly-shaped display panel and cutting method are provided. The display panel includes a display region and a non-display region surrounding the display region. The non-display region includes at least one irregularly-shaped boundary. The irregularly-shaped display panel further includes a substrate and the substrate includes a base substrate. The non-display region includes laser cutting trajectories. An orthographic projection of each of the laser cutting trajectories to the base substrate at least partially overlaps an orthographic projection of a corresponding irregularly-shaped boundary. Each of the laser cutting trajectories includes a cutting entry point and a cutting exit point at two ends thereof, and at least one of the cutting entry point and the cutting exit point does not overlap the orthographic projection of the corresponding irregularly-shaped boundary. The laser cutting trajectories are used as a laser cutting path.

11 Claims, 10 Drawing Sheets

100

200

IRREGULARLY-SHAPED DISPLAY PANEL AND CUTTING METHOD

CROSS-REFERENCES TO RELATED APPLICATION

This application claims the priority of Chinese Patent Application No. 201810994246.3, filed on Aug. 29, 2018, the content of which is incorporated herein by reference in its entirety.

TECHNICAL FIELD

The present disclosure generally relates to the field of display technology and, more particularly, relates to an irregularly-shaped display panel and a cutting method.

BACKGROUND

In a current process for forming an irregularly-shaped display panel, a rectangular display panel is usually cut to form an irregularly-shaped display panel with an appropriate size and shape. A laser cutting method is usually used to cut the rectangular display panel. Some circuit structures, such as gate driving circuits, are deployed in a non-display region (that is frame regions) of the rectangular display panel. The circuits structures usually include electronic devices.

In a laser cutting process, a laser path enters from edge positions of the rectangular display panel into an inside of the rectangular display panel. The laser cutting process produces a large thermal energy. A light path of the laser may be refected and/or refracted when the laser passes the edge positions of the rectangular display panel, and the thermal energy may fly out to produce sputtering. When the laser is sputtered onto the circuit structures in the non-display region of the rectangular display panel, the electronic devices in the circuit structures may be damaged. Correspondingly, a good product ratio and a reliability of the product may be reduced.

SUMMARY

One aspect of the present disclosure provides an irregularly-shaped display panel. The display panel includes a display region and a non-display region surrounding the display region. The non-display region includes at least one irregularly-shaped boundary. The irregularly-shaped display panel further includes a substrate and the substrate includes a base substrate. The non-display region includes laser cutting trajectories corresponding to the at least one irregularly-shaped boundary. An orthographic projection of each of the laser cutting trajectories to the base substrate at least partially overlaps an orthographic projection of corresponding one of the at least one irregularly-shaped boundary to the base substrate. Each of the laser cutting trajectories includes a cutting entry point and a cutting exit point at two ends of the one of the laser cutting trajectories. In each of the laser cutting trajectories, at least one of the cutting entry point and the cutting exit point does not overlap the orthographic projection of corresponding one of the at least one irregularly-shaped boundary to the base substrate. The laser cutting trajectories are used as a path of a laser when using the laser to cutting the irregularly-shaped display panel.

Another aspect of the present disclosure provides a cutting method for an irregularly-shaped display device. The method includes: providing a to-be-cut display panel including a substrate, forming laser cutting trajectories on the to-be-cut display panel, and cutting the to-be-cut display panel along the laser cutting trajectories using a laser, to form the irregularly-shaped display panel. The substrate includes a base substrate. The laser cutting trajectories divide the to-be-cut display panel to a first region and a second region. The first region includes a display region and a non-display region surrounding the display region; while the second region locates at a side of the non-display region away from the display region. The non-display region includes at least one irregularly-shaped boundary and the laser cutting trajectories correspond to the at least one irregularly-shaped boundary. An orthographic projection of each of the laser cutting trajectories to the base substrate at least partially overlaps an orthographic projection of corresponding one of the at least one irregularly-shaped boundary to the base substrate, and each of the laser cutting trajectories includes a cutting entry point and a cutting exit point at two ends of the one of the laser cutting trajectories. In each of the laser cutting trajectories, at least one of the cutting entry point and the cutting exit point does not overlap the orthographic projection of corresponding one of the at least one irregularly-shaped boundary to the base substrate. The irregularly-shaped display panel is formed in the first region.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
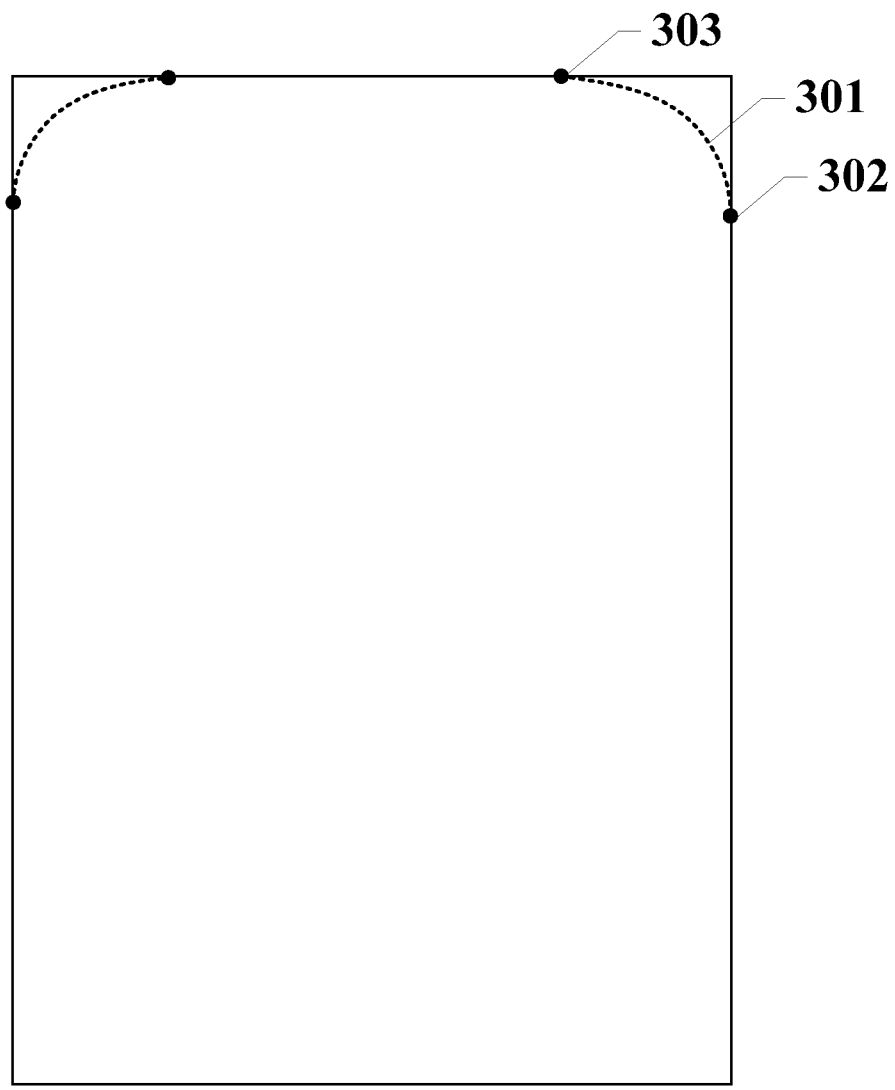
FIG. 1 illustrates a position relationship between laser cutting trajectories and a display panel in a laser cutting process.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width and depth should be considered during practical fabrication.

In a current process for forming an irregularly-shaped display panel, a regular rectangular display panel is usually cut to form an irregularly-shaped display panel with an appropriate size and shape. A laser cutting method is usually used to cut the rectangular display panel. Some circuit structures such as gate driving circuits usually are deployed in a non-display region (that is frame regions) of the rectangular display panel. The circuits structures usually include electronic devices.

In the laser cutting method, a laser path in the laser cutting process is cut from edge positions of the rectangular display panel into an inside of the rectangular display panel. The laser cutting process produces a large thermal energy. A light path of the laser may be refected and/or refracted when the laser passes the edge positions of the rectangular display panel, and the thermal energy may fly out and sputter. When the laser is sputtered on the circuit structures in the non-display region of the rectangular display panel, the electronic devices in the circuit structures may be damaged. Correspondingly, a good product ratio and a reliability of the product may be reduced.

FIG. 1 illustrates a positional relationship between a laser cutting trajectory 301 and a display panel 300 in a laser cutting process. A cutting entry point 302 and a cutting exit point 303 of the laser cutting trajectory 301 are both located at an edge of the display panel 300. In the laser cutting process, a laser path is refracted and/or refected at the edge of the display panel 300 corresponding to the cutting entry point 302 and the cutting exit point 303 of the laser cutting trajectory 300. The energy may fly out and sputter. When the energy is sputtered into the display panel, the electronic devices in the display panel may be damaged.

The present disclosure provides an irregularly-shaped display panel and a cutting method for forming an irregular-shape display panel to resolved above problems. In the cutting method provided by various embodiments of the present disclosure, for each of laser cutting trajectories, at least one of an entry point and an out point may not overlap corresponding one of irregularly-shaped boundaries of the irregularly-shaped display panel. That is at least one of the cutting entry point and the cutting exit point of each of the laser cutting trajectories may be moved into an inside of the display panel. A possibility that a laser energy is sputtered from the edge of the display panel into the inside of the display panel to damage devices in the laser cutting method may be reduced.

Figure 2:
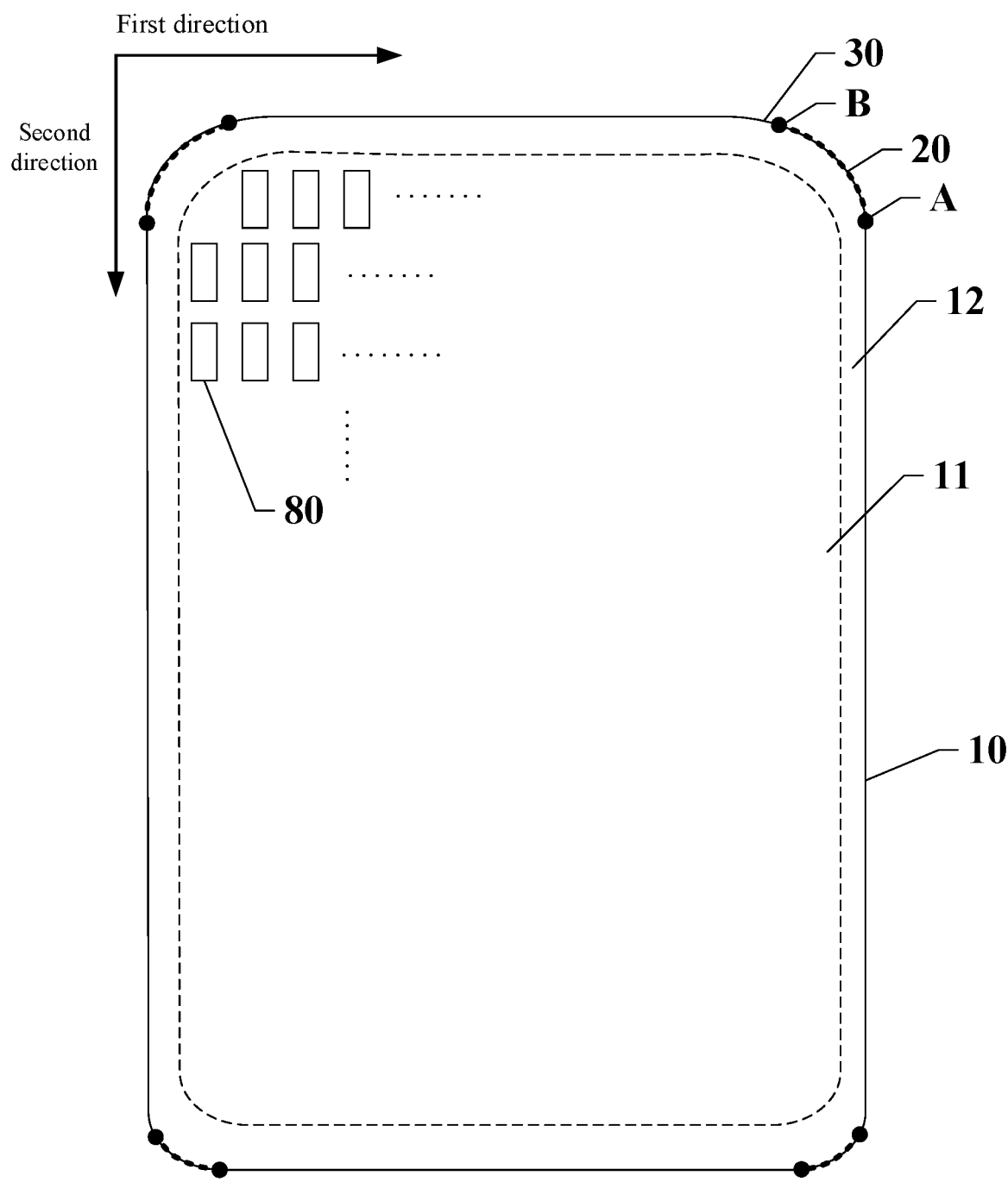
FIG. 2 illustrates a top view of an exemplary irregularly-shaped display panel consistent with various disclosed embodiments in the present disclosure.
Figure 3:
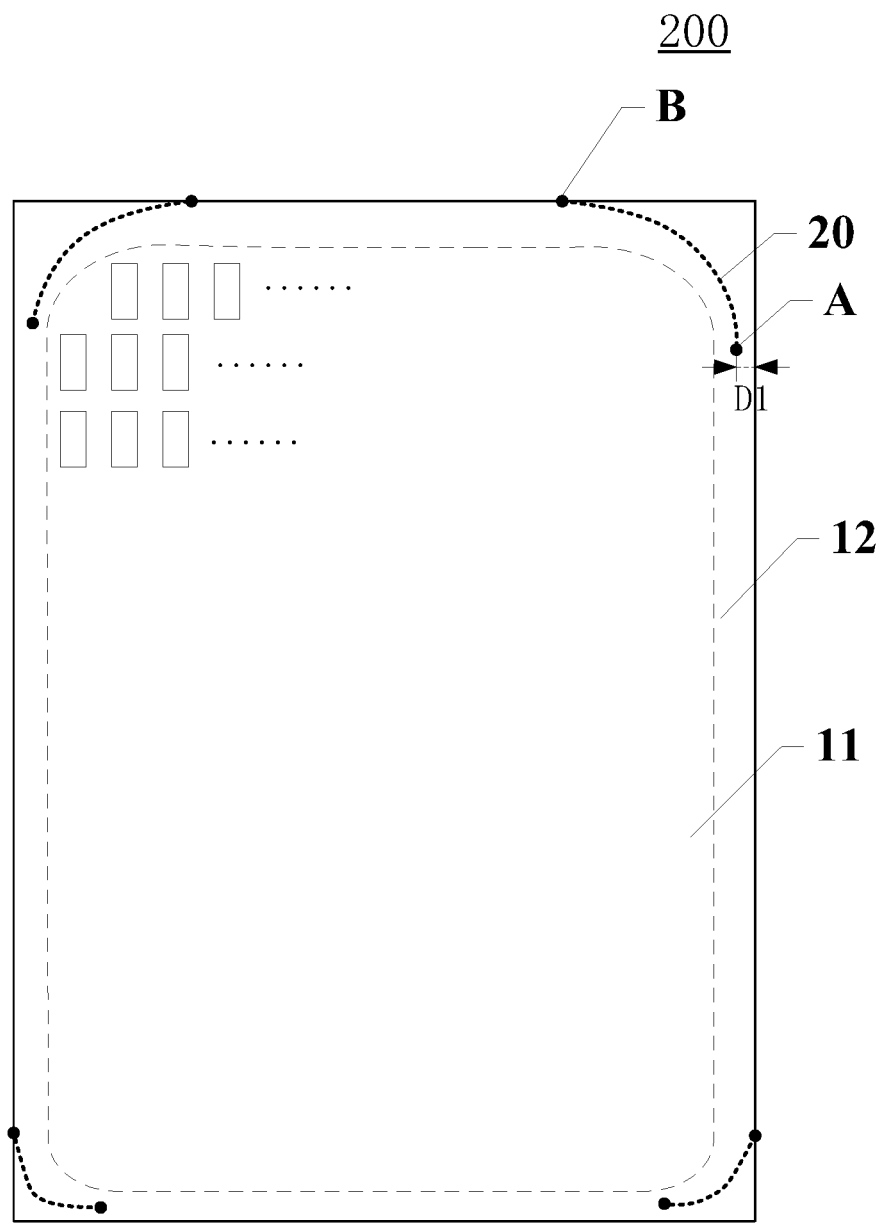
FIG. 3 illustrates a top view of a rectangular display panel which is used to form an exemplary irregularly-shaped display panel consistent with various disclosed embodiments in the present disclosure.

FIG. 2 illustrates a top view of an exemplary irregularly-shaped display panel consistent with various disclosed embodiments in the present disclosure; and FIG. 3 illustrates a top view of a rectangular display panel which is used to form an exemplary irregularly-shaped display panel in FIG. 2. The irregularly-shaped display panel 100 in FIG. 2 is formed by cutting the rectangular display panel 200 in FIG. 3. As illustrated in FIGS. 2-3, one embodiment of the present disclosure may provide an irregularly-shaped display panel 100. The irregularly-shaped display panel 100 may include a display region 11 and a non-display region 12 surrounding the display region 11. The non-display region 12 may include at least one irregularly-shaped boundary 30.

The irregularly-shaped display panel 100 may include a substrate 10. The substrate 10 may include a base substrate.

The non-display region 12 may include laser cutting trajectories 20 corresponding to the at least one irregularly-shaped boundary 30. An orthographic projection of each of the laser cutting trajectories 20 to the base substrate may at least partially overlap an orthographic projection of corresponding one of the at least one irregularly-shaped boundary 30 to the base substrate. Each of the laser cutting trajectories 20 may include a cutting entry point A and a cutting out point B at ends of the one of the laser cutting trajectories 20. For each of the laser cutting trajectories 20, at least one of the cutting entry point A and the cutting exit point B may not overlap the orthographic projection of corresponding one of the at least one irregularly-shaped boundary 30 to the base substrate.

The laser cutting trajectories 20 may be used as a laser cutting path when using the laser to cutting the irregularly-shaped display panel 100.

As illustrated in FIGS. 2-3, the irregularly-shaped display panel 100 may include the display region 11 and the non-display region 12 surrounding the display region 11. The non-display region 12 may include the at least one irregularly-shaped boundary 30. A plurality of subpixels 80 may be disposed in the display region 11 of the irregularly-shaped display panel 100 along a first direction and a second direction. In a regular display panel, edges of the display panel may be parallel or perpendicular to the first direction and the second direction, and the display panel may be rectangular. In one embodiment of the present disclosure, the non-display region 12 may include the at least one irregularly-shaped boundary 30. The at least one irregularly-shaped boundary 30 may be a boundary where the first direction crosses the second direction, and may make the display panel having a non-rectangular structure. In one embodiment illustrated in FIG. 2, the irregularly-shaped display panel 100 may be formed by cutting a rectangular display panel 200 in FIG. 3 using the laser. The display panel 200 in FIG. 3 may include the laser cutting trajectories 20 and the at least one irregularly-shaped boundary 30 may be formed in positions corresponding to the laser cutting trajectories 20. In one embodiment illustrated in FIG. 3, for each of the laser cutting trajectories 20, the cutting entry point A may not overlap the orthographic projection of corresponding one of the at least one irregularly-shaped boundary 30 to the base substrate. The cutting entry point A may be located at a side of the edge of the rectangular display panel 200 close to the display region 11 and in non-edge regions of the rectangular display panel 200. In process for cutting the rectangular display panel 200 along each of the laser cutting trajectories 20 in FIG. 3, a laser spot may not or may rarely pass a portion of the edge of the rectangular display panel 200 close to the cutting entry point A when cutting the rectangular display panel at the cutting entry point A since the cutting entry point A may be located in the non-edge regions of the rectangular display panel 200. A refraction and/or reflection of a path of the laser in the edge region of the irregularly-shaped display panel may be suppressed, and an energy of the laser may not sputter to damage internal devices of the irregularly-shaped display panel. Correspondingly, a good product ratio and a product reliability may be improved.

The embodiment illustrated in FIGS. 2-3 only schematically shows the subpixels 80 and the laser cutting trajectories 20, and do not represent actual sizes and quantities. Also, in the embodiment illustrated in FIG. 3, the cutting entry point A may be located in the non-edge region and the cutting exit point B may be located in the edge region, for each of the laser cutting trajectories. In another embodiment illustrated in FIG. 4, the cutting entry point A may be located in the edge region and the cutting exit point B may be located in the non-edge region, for each of the laser cutting trajectories. The refraction and/or reflection of the path of the laser in the edge region of the irregularly-shaped display panel may be suppressed, and the energy of the laser may not sputter to damage internal devices of the irregularly-shaped display panel.

Figure 5:
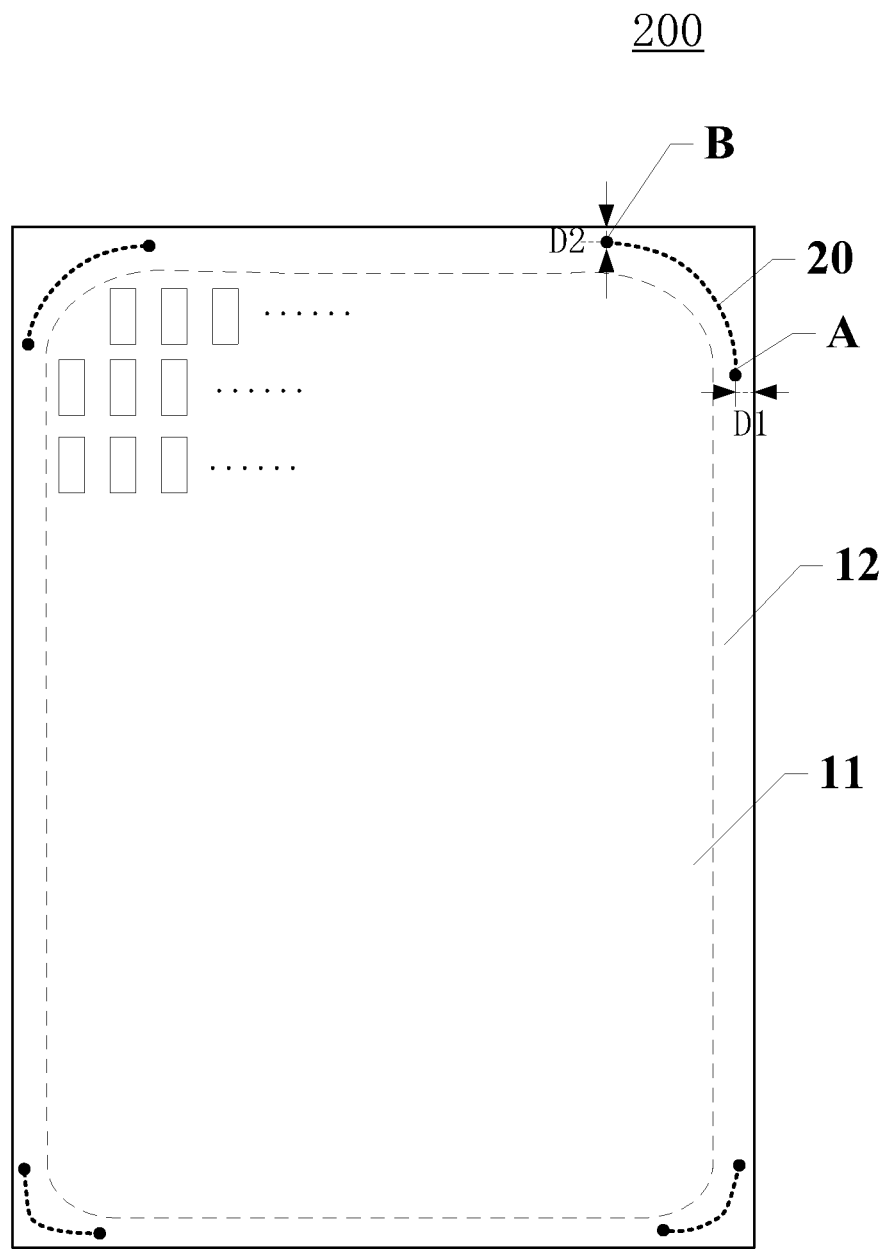
FIG. 5 illustrates another top view of a rectangular display panel which is used to form another exemplary irregularly-shaped display panel consistent with various disclosed embodiments in the present disclosure.

FIG. 5 illustrates a top view of another rectangular display panel which is used to form an exemplary irregularly-shaped display panel provided by another embodiment in the present disclosure. In the embodiment illustrated in FIG. 5, for each of the laser cutting trajectories 20, both of the cutting entry point A and the cutting exit point B may not overlap the orthographic projection of corresponding one of the at least one irregularly-shaped boundary 30 to the base substrate. Correspondingly, both of the cutting entry point A and the cutting exit point B may be located in the non-edge region of the rectangular display panel 200. In a process for cutting the rectangular display panel 200 along the laser cutting trajectories 20 in FIG. 5, both of a start point and an end point of a cutting process may be located at a position of the edge of the rectangular display panel 200 close to the display region. Correspondingly, in the whole laser cutting process, the laser spot may not pass a portion of the edge of the rectangular display panel 200 close to the cutting entry point A and a portion of the edge of the rectangular display panel 200 close to the cutting exit point B, for each of the laser cutting trajectories 20. The refraction and/or reflection of the path of the laser in the edge region of the irregularly-shaped display panel may be suppressed significantly, and an energy of the laser may not sputter to damage internal devices of the irregularly-shaped display panel. Correspondingly, a good product ratio and a product reliability may be improved.

Figure 6:
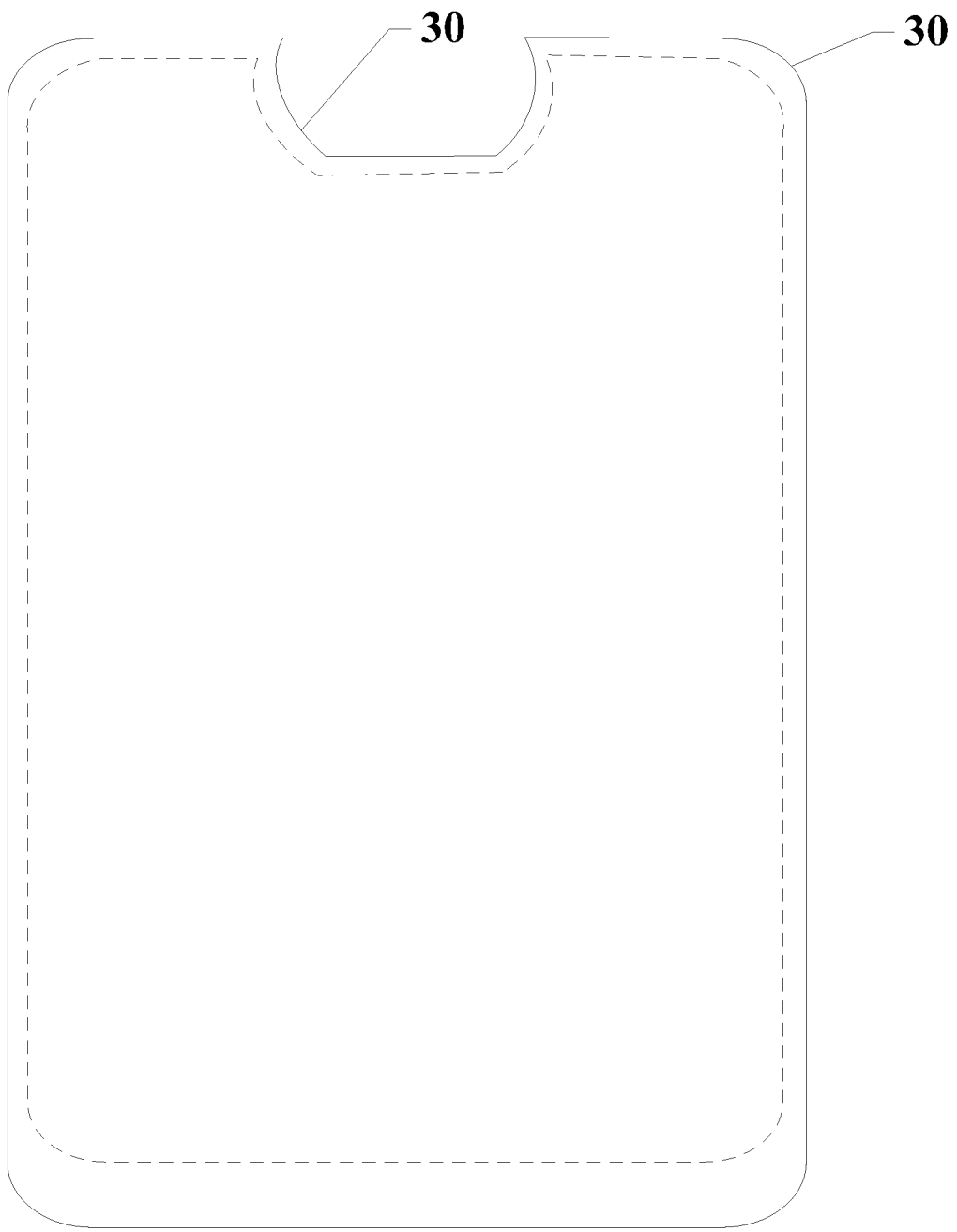
FIG. 6 illustrates another top view of another exemplary irregularly-shaped display panel consistent with various disclosed embodiments in the present disclosure.

In the present disclosure, the at least one irregularly-shaped boundary 30 of the irregularly-shaped display panel 100 may be a line boundary, a polyline boundary, an arcuate boundary, or any combination thereof. In one embodiment illustrated in FIG. 1, the at least one irregularly-shaped boundary 30 may be distributed at four corners of the display panel and may be the arcuate boundary. For description purposes only, the embodiment in FIG. 1 is used as an example only to illustrate the present disclosure and should not limit the scopes of the present disclosure. For example, in another embodiment illustrated in FIG. 6, the at least one irregularly-shaped boundary 30 may include four arcuate boundaries at four corners of the display panel and a combination of an arcuate boundary and a line boundary at a top of the irregularly-shaped display panel. In various embodiments, the irregularly-shaped display panel 100 may include any suitable number of irregularly-shaped boundaries 30 with any suitable structure, and the present disclosure has no limit on these.

In one embodiment illustrated in FIGS. 2-3 and FIG. 5, for each of the laser cutting trajectories 20, a minimum distance between the cutting entry point A and corresponding one of the at least one irregularly-shaped boundary 30 may be D1, where D1≥50 μm.

As illustrated in FIG. 3 and FIG. 5, the cutting entry point A of the laser cutting trajectories 20 may be located in the non-edge region and there may be a certain distance between the cutting entry point A and the at least one irregularly-shaped boundary 30 for each of the laser cutting trajectories 20. If the distance between the cutting entry point A and the at least one irregularly-shaped boundary 30 for each of the laser cutting trajectories 20 is too small, the laser spot may diffuse into the edge region of the base substrate to sputter when performing the laser cutting process at the cutting entry point A, and the electronic devices may be damaged. In one embodiment of the present disclosure, the minimum distance D1 between the cutting entry point A for each of the laser cutting trajectories 20 and corresponding one of the at least one irregularly-shaped boundary 30 may be larger than or equal to 50 μm, and the laser may not sputter in a region of the irregularly-shaped display panel 100 close to the cutting entry point A to interfere with the product performance. Correspondingly, when D1≥50 μm, the laser energy surrounding the cutting entry point A for each of the laser cutting trajectories 20 may not sputter to damage the internal devices of the irregularly-shaped display panel 100. The good product ratio and the product reliability may be improved.

Figure 4:
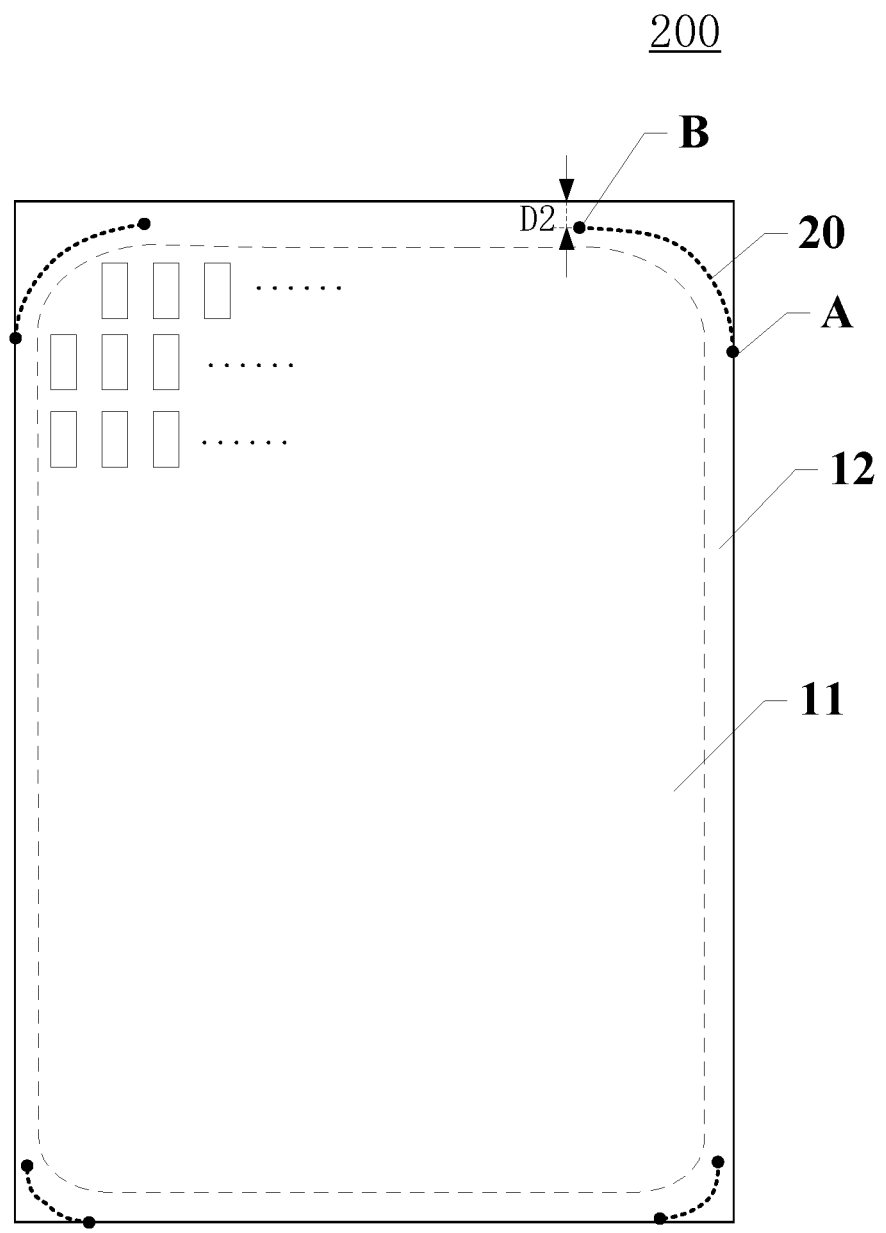
FIG. 4 illustrates another top view of a rectangular display panel which is used to form another exemplary irregularly-shaped display panel consistent with various disclosed embodiments in the present disclosure.

In one embodiment illustrated in FIG. 2 and FIGS. 4-5, for each of the laser cutting trajectories 20, a minimum distance between the cutting exit point B and the at least one irregularly-shaped boundary 30 may be D2, where D2≥50 μm.

As illustrated in FIG. 4 and FIG. 5, the cutting exit point B of each of the laser cutting trajectories 20 may be located in the non-edge region and there may be a certain distance between the cutting exit point B for each of the laser cutting trajectories 20 and the at least one irregularly-shaped boundary 30. If the distance between the cutting exit point B for each of the laser cutting trajectories 20 and corresponding one of the at least one irregularly-shaped boundary 30 is too small, the laser spot may diffuse into the edge region of the base substrate to sputter when performing the laser cutting process at the cutting exit point B for each of the laser cutting trajectories 20, and the electronic devices may be damaged. In one embodiment of the present disclosure, the minimum distance D2 between the cutting exit point B for each of the laser cutting trajectories 20 and corresponding one of the at least one irregularly-shaped boundary 30 may be larger than or equal to 50 µm, and the laser may not sputter in a region of the irregularly-shaped display panel 100 close to the cutting exit point B to interfere the product performance. Correspondingly, when D2≥50 µm, the laser energy surrounding the cutting exit point B for each of the laser cutting trajectories 20 may not sputter to damage the internal devices of the irregularly-shaped display panel 100. The good product ratio and the product reliability may be improved.

Circuit structures including gate driving circuits may be disposed in the non-display region of the irregularly-shaped display panel. In one embodiment illustrated in FIGS. 3-5, an orthographic projection of the laser cutting trajectories 20 to the base substrate may not overlap the circuit structures in the non-display region 12, and may be located at a side of the circuit structures in the non-display region 12 away from the display region. Correspondingly, a portion cut from the rectangular display panel 200 may not include the circuit structures. Since the cutting entry point A and the cutting exit point B may be located at the ends of the laser cutting trajectories 20, positions of the cutting entry point A and the cutting exit point B may not overlap the circuit structures in the non-display region 12.

Figure 7:
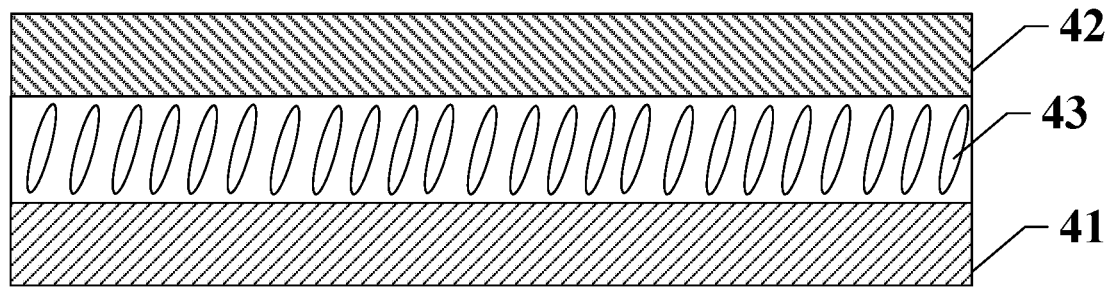
FIG. 7 illustrates a cross-sectional of a rectangular display panel which is used to form an exemplary irregularly-shaped display panel consistent with various disclosed embodiments in the present disclosure.
Figure 8:
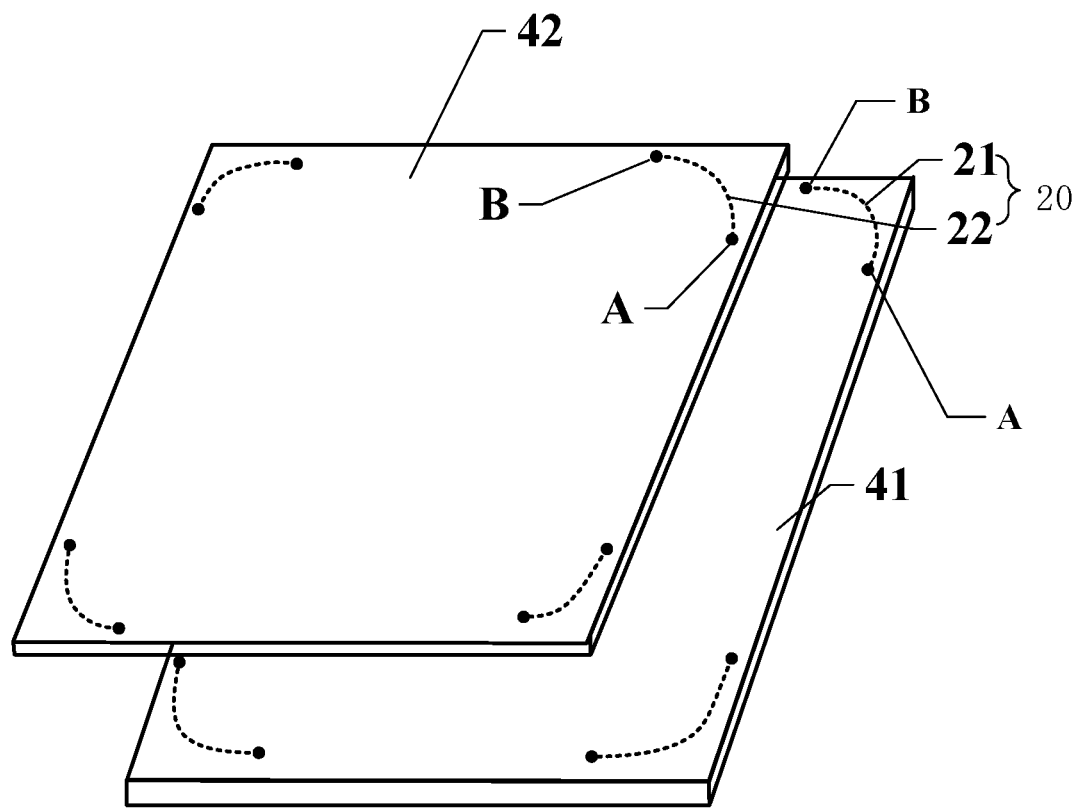
FIG. 8 illustrates a structure of a rectangular display panel which is used to form an exemplary irregularly-shaped display panel consistent with various disclosed embodiments in the present disclosure.

FIG. 7 illustrates a cross-section view of a rectangular display panel which is used to form an exemplary irregularly-shaped display panel consistent with various disclosed embodiments in the present disclosure; and FIG. 8 illustrates a structure of a rectangular display panel which is used to form an exemplary irregularly-shaped display panel consistent with various disclosed embodiments in the present disclosure. In one embodiment illustrated in FIGS. 7-8, the substrate 10 of the irregularly-shaped display panel 100 may include a first substrate 41 and a second substrate 42 opposite to the first substrate 41.

The laser cutting trajectories 20 may include a first laser cutting trajectories 21 in the first substrate 41 and a second laser cutting trajectories 22 in the second substrate 42. The first laser cutting trajectories 21 and the second laser cutting trajectories 22 may be deployed in a one-to-one corresponding relationship. An orthographic projection of the first laser cutting trajectories 21 to the base substrate may overlap an orthographic projection of the second laser cutting trajectories 22.

As illustrated in FIGS. 7-8, the rectangular display panel 200 used to form the irregularly-shaped display panel 100 may include a substrate 10, and the substrate 10 of the rectangular display panel 200 may include a first substrate 41 and a second substrate 42 opposite to the first substrate 41. Since the at least one irregularly-shaped boundary 30 of the irregularly-shaped display panel 100 may be formed by the laser cutting process, the first laser cutting trajectories 21 and the second laser cutting trajectories may be formed on the first substrate 41 and the second substrate 42 of the rectangular display panel 200 respectively when the substrate 10 of the rectangular display panel 200 may include the first substrate 41 and the second substrate 42 opposite to the first substrate 41. The first laser cutting trajectories 21 and the second laser cutting trajectories 22 may be deployed in a one-to-one corresponding relationship of positions and shapes. In the laser cutting process, the first substrate 41 and the second substrate 42 may be cut along the first laser cutting trajectories 21 and the second laser cutting trajectories 22 respectively, to form the at least one irregularly-shaped boundary 30 in the first substrate 41 and the second substrate 42 respectively. At least one of the cutting entry points A and the cutting exit points B of the first laser cutting trajectories 21 and the second laser cutting trajectories 22 may not overlap the orthographic projection of the irregularly-shaped boundaries 30 to a plane of the substrate 10. Correspondingly, at least one of the cutting entry points A and the cutting exit points B of the first laser cutting trajectories 21 and the second laser cutting trajectories 22 may be not located at the edge region of the display panel. The refraction and/or reflection of the path of the laser in the edge region of the irregularly-shaped display panel may be suppressed significantly, and an energy of the laser may not sputter to damage internal devices of the irregularly-shaped display panel. Correspondingly, a good product ratio and a product reliability may be improved.

In one embodiment, the irregularly-shaped display panel 100 may be a liquid-crystal display panel illustrated in FIG. 7. In the irregularly-shaped display panel 100, the first substrate 41 may be an array substrate, and the second substrate 42 may be a color film substrate. In another embodiment, the first substrate 41 may be a color film substrate, and the second substrate 42 may be an array substrate. When the irregularly-shaped display panel 100 is a liquid-crystal display panel, a liquid crystal layer 43 may be disposed between the array substrate and the color film substrate. In the laser cutting process, the array substrate and the color film substrate may be cut respectively to form the at least one irregularly-shaped boundary 30 on the array substrate and the color film substrate. An orthographic projection of the at least one irregularly-shaped boundary 30 on the array substrate and an orthographic projection of the at least one irregularly-shaped boundary 30 on the color film substrate may overlap.

Figure 9:
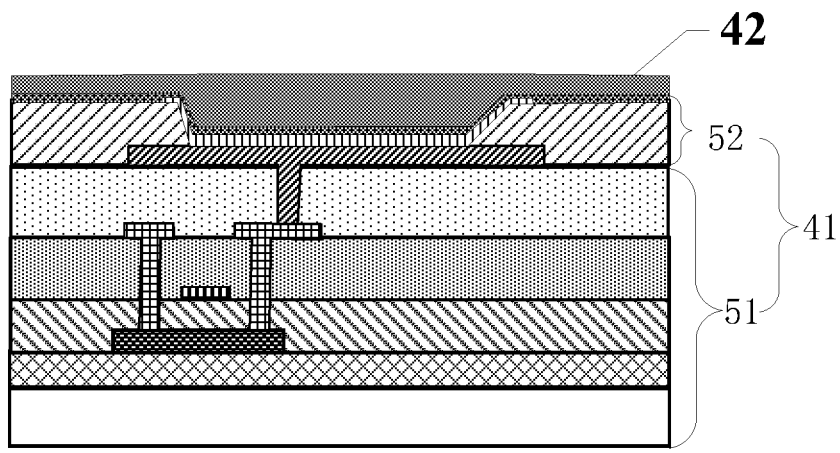
FIG. 9 illustrates a cross-sectional view of another exemplary irregularly-shaped display panel consistent with various disclosed embodiments in the present disclosure.

In another embodiment illustrated in FIG. 9 showing a cross-sectional view of an exemplary irregularly-shaped display panel 100, the irregularly-shaped display panel 100 may be an organic light-emitting display panel. The first substrate 41 may be an array substrate, and the second substrate 42 may be an opposite substrate. In another embodiment, the first substrate 41 may be an opposite substrate, and the second substrate 42 may be an array substrate. In the irregularly-shaped display panel 100 illustrated in FIG. 9, the array substrate may include a driving functional layer 51 and a light-emitting functional layer 52, while the opposite substrate 52 may package the light-emitting functional layer 52. The laser cutting trajectories 20 in the array substrate and the opposite substrate may be similar to the laser cutting trajectories 20 in FIG. 8 and the present disclosure has no limit on this. In the laser cutting process, the array substrate and the opposite substrate may be cut respectively to form the at least one irregularly-shaped boundary 30 on the array substrate and the opposite substrate. An orthographic projection of the at least one irregularly-shaped boundary 30 on the array substrate and an orthographic projection of the at least one irregularly-shaped boundary 30 on the opposite substrate may overlap.

Figure 10:
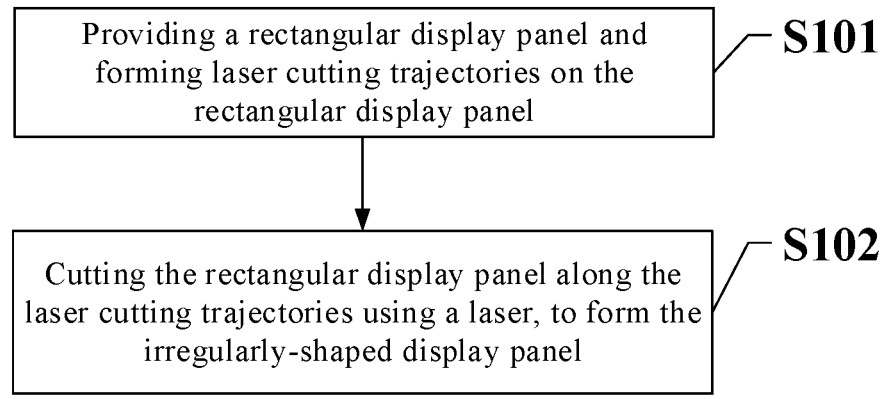
FIG. 10 illustrates an exemplary cutting method for forming an irregularly-shaped display panel consistent with various disclosed embodiments in the present disclosure.
Figure 11:
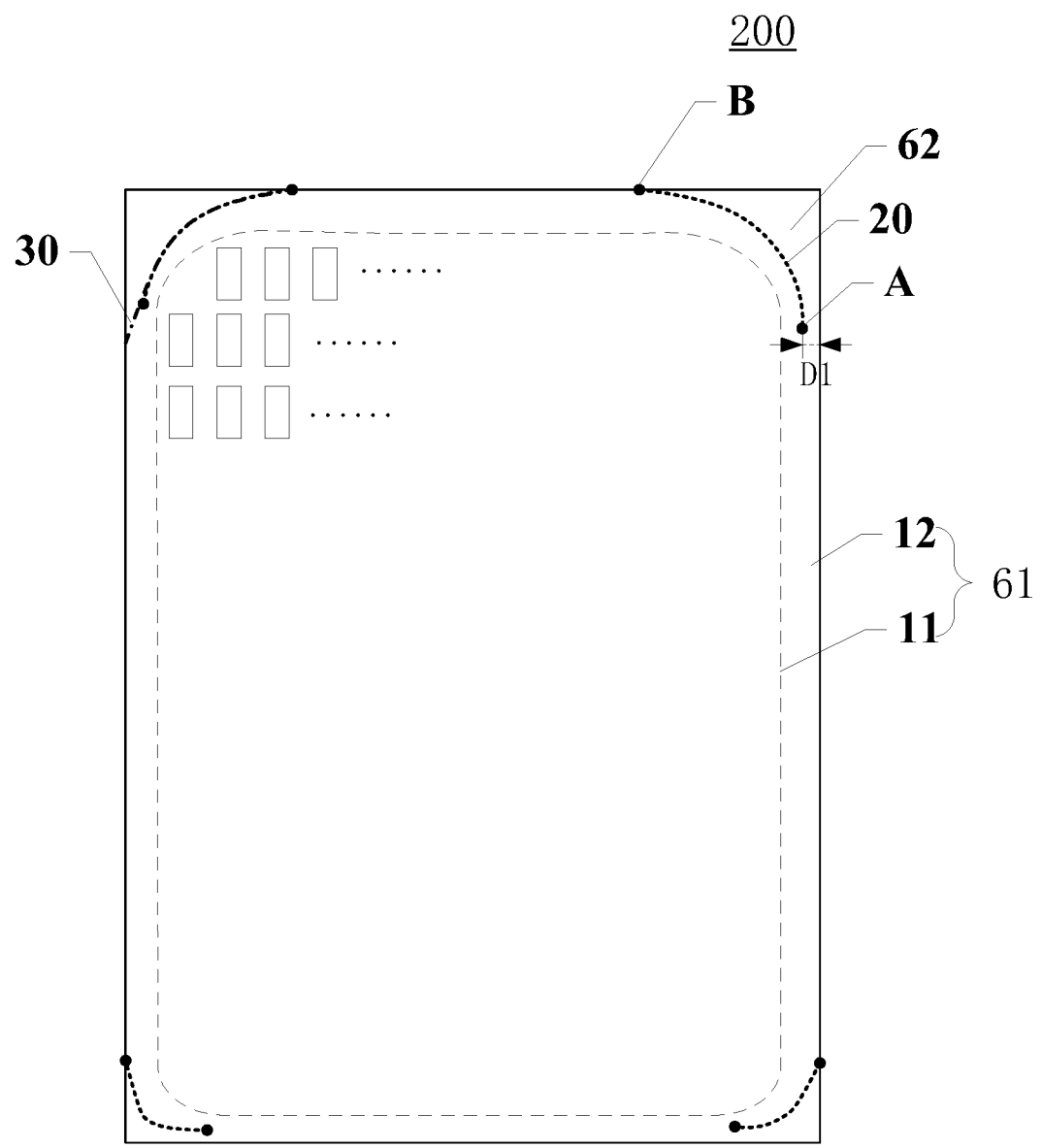
FIG. 11 illustrates a top view of a to-be-cut display panel in an exemplary cutting method for forming an irregularly-shaped display panel consistent with various disclosed embodiments in the present disclosure.

The present disclosure also provides a cutting method to form an irregularly-shaped display panel 100. In one embodiment illustrated in FIG. 10, the cutting method may include:

S101: providing a rectangular display panel 200 as illustrated in FIG. 8 and FIG. 11. FIG. 11 illustrates a top view of the rectangular display panel 200 in an exemplary cutting method for forming the irregularly-shaped display panel. Laser cutting trajectories 20 may be formed in the rectangular display panel 200. The laser cutting trajectories 20 may divide the rectangular display panel 200 to a first region 61 and a second region 62. The first region 61 may include a display region 11 and a non-display region 12 surrounding the display region 11. The second region 62 may be located at a side of the non-display region 12 away from the display region. In one embodiment illustrated in FIG. 11, the second region 12 may be located at corners of the rectangular display panel 200. The non-display region 12 may include at least one irregularly-shaped boundary 30. For description purposes only, the embodiment in FIG. 11 only showing one irregularly-shaped boundary 30 is used as an example only and should not limit the scopes of the present disclosure. The rectangular display panel 200 may include a substrate 10, and the substrate 10 may include a base substrate. The laser cutting trajectories 20 may correspond to the at least one irregularly-shaped boundary 30. An orthographic projection of one of the laser cutting trajectories 20 to the base substrate may at least partially overlap an orthographic projection of corresponding one of the at least one irregularly-shaped boundary 30 to the base substrate. Each of the laser cutting trajectories 20 may include a cutting entry point A and a cutting exit point B at two ends of the one of the laser cutting trajectories 20. In each of the laser cutting trajectories 20, an orthographic projection of at least one of the cutting entry point A and the cutting exit point B to the base substrate may not overlap the orthographic projection of corresponding one of the at least one irregularly-shaped boundary 30 to the base substrate.

S102: cutting the substrate 10 using a laser along the laser cutting trajectories 20, to form the irregularly-shaped display panel 100 in the first region 61 as illustrated in FIG. 2.

In one embodiment of the present disclosure, the rectangular display panel 200 as illustrated in FIG. 8 may be provided in S101. The laser cutting trajectories 20 may be formed in the rectangular display panel 200. The laser cutting trajectories 20 may divide the rectangular display panel 200 to the first region 61 and the second region 62. The first region 61 may correspond to the formed irregularly-shaped display panel 100, and may include the display region 11 and the non-display region 12 surrounding the display region 11. The second region 62 may be a to-be-removed region, and may be located at corners of the rectangular display panel 200. The second region 62 may be removed later to form the irregularly-shaped display panel 100 in FIG. 2. The laser cutting trajectories 20 on the rectangular display panel 200 may be a path of the laser when cutting the rectangular display 200 using the laser. Each of the laser cutting trajectories 20 may include a cutting entry point A and a cutting exit point B at two ends of the one of the laser cutting trajectories 20. In each of the laser cutting trajectories 20, an orthographic projection of the cutting entry point A may not overlap the orthographic projection of corresponding one of the at least one irregularly-shaped boundary 30 to the base substrate, and the cutting entry point A may be located at a side of the at least one irregularly-shaped boundary 30 close to the display region 11 and in a non-edge region of the rectangular display panel 200.

In S102 for cutting the rectangular display panel 200 using the laser along the laser cutting trajectories, when cutting at the cutting entry point A of each of the laser cutting trajectories 20, the laser spot may not or may rarely pass the edge of the rectangular display panel 200 close to the cutting entry point A since the cutting entry point A may be located at a side of the edge of the rectangular display panel 200 close to the display region 11. The refraction and/or reflection of the path of the laser in the edge region of the irregularly-shaped display panel 100 may be suppressed significantly, and an energy of the laser may not sputter to damage internal devices of the irregularly-shaped display panel 100. Correspondingly, a good product ratio and a product reliability may be improved.

In the above embodiment, the cutting entry point A of each of the laser cutting trajectories 20 may not overlap corresponding one of the at least one irregularly-shaped boundary 30, to avoid an influence of the laser spot on the edge region of the irregularly-shaped display panel close to the cutting entry point A in the laser cutting process. In some other embodiments, in the rectangular display panel 200 illustrated in FIG. 4, in each of the laser cutting trajectories 20, an orthographic projection of the cutting exit point B may not overlap the orthographic projection of corresponding one of the at least one irregularly-shaped boundary 30 to the base substrate. When cutting along one of the laser cutting trajectories 20 and arriving the cutting exit point B of the one of the laser cutting trajectories 20, the laser spot may not affect the edge region of the irregularly-shaped display panel 100 close to the cutting exit point B of the one of the laser cutting trajectories 20 in the laser cutting process. The energy of the laser may not sputter to damage internal devices of the irregularly-shaped display panel 100. Correspondingly, a good product ratio and a product reliability may be improved.

In some other embodiments illustrated in FIG. 5, for the rectangular display panel, in each of the laser cutting trajectories 20, both of an orthographic projection of the cutting entry point A and an orthographic projection of the cutting exit point B may not overlap the orthographic projection of corresponding one of the at least one irregularly-shaped boundary 30 to the base substrate. When cutting the rectangular display panel 200 along each of the laser cutting trajectories 20, a cutting start point and a cutting end point may be located both at a side of the edge of the rectangular display panel 200 close to the display region. In the laser cutting process, the laser spot may not pass the edge of the rectangular display 200 close to the cutting entry point A and the cutting exit point B for each of the laser cutting trajectories 20. The refraction and/or reflection of the path of the laser in the edge region of the irregularly-shaped display panel 100 may be suppressed significantly, and an energy of the laser may not sputter to damage internal devices of the irregularly-shaped display panel 100. Correspondingly, a good product ratio and a product reliability may be improved.

In one embodiment, the substrate 10 of the irregularly-shaped display panel 100 may include a first substrate 41 and a second substrate 42 opposite to the first substrate 41. The laser cutting trajectories 20 may include first laser cutting trajectories 21 in the first substrate 41 and second laser cutting trajectories 22 in the second substrate 42. The first laser cutting trajectories 21 and the second laser cutting trajectories 22 may be deployed in a one-to-one corresponding relationship. An orthographic projection of each of the first laser cutting trajectories 21 to the base substrate may overlap an orthographic projection of corresponding one of the second laser cutting trajectories 22.

S102 for cutting the rectangular display panel 200 along the laser cutting trajectories 20 using the laser may include: cutting the first substrate 41 along the first laser cutting trajectories 21 using the laser and then cutting the second substrate 41 along the second laser cutting trajectories 22 using the laser; or cutting the second substrate 41 along the second laser cutting trajectories 22 using the laser and then cutting the first substrate 41 along the first laser cutting trajectories 21 using the laser.

Figure 12:
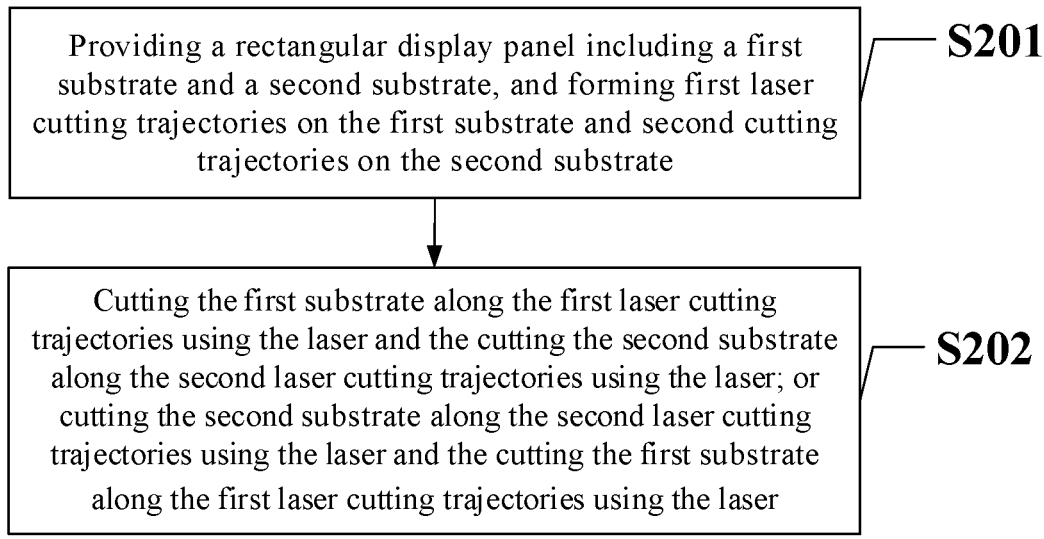
FIG. 12 illustrates another exemplary cutting method for forming an irregularly-shaped display panel consistent with various disclosed embodiments in the present disclosure.

In the cutting method for forming the irregularly-shaped display panel provided by the embodiment illustrated in FIG. 12, when the irregularly-shaped display panel has a structure illustrated in FIG. 7, the first laser cutting trajectories 21 and the second laser cutting trajectories 22 in a one-to-one corresponding relationship may be formed in the first substrate 41 and the second substrate 42 in S101. Then two laser cutting may be performed in S202. This means the first substrate 41 and the second substrate 42 may be cut along the first laser cutting trajectories 21 and the second laser cutting trajectories 22 respectively, to form the at least one irregularly-shaped boundary 30 in the first substrate 41 and the second substrate 42 respectively. The at least one irregularly-shaped boundary 30 in the first substrate 41 and the second substrate 42 may have a same shape. An orthographic projection of at least one of the cutting entry point A and the cutting exit point B for each of the first laser cutting trajectories 21 and the second laser cutting trajectories 22 may not overlap an orthographic projection of the at least one irregularly-shaped boundary 30 to the plane of the substrate 10, and at least one of the cutting entry point A and the cutting exit point B may not be located in the edge of the rectangular display panel 200. The refraction and/or reflection of the path of the laser in the edge region of the rectangular display panel 200 may be suppressed significantly, and an energy of the laser may not sputter to damage internal devices of the rectangular display panel 200. Correspondingly, a good product ratio and a product reliability may be improved.

For description purposes only, the embodiment in FIG. 7 where the irregularly-shaped display panel 100 is a liquid-crystal display panel is used as an example to illustrate the present disclosure and should not limit the scopes of the present disclosure. In various embodiment, the irregularly-shaped display panel 100 may be any suitable display panel and the cutting method for forming the irregularly-shaped display panel 100 may be applied too. For example, in some other embodiments, the irregularly-shaped display panel 100 may be an organic light-emitting display panel, and the cutting method for forming the irregularly-shaped display panel 100 provided by the present disclosure may be adopted.

Figure 13:
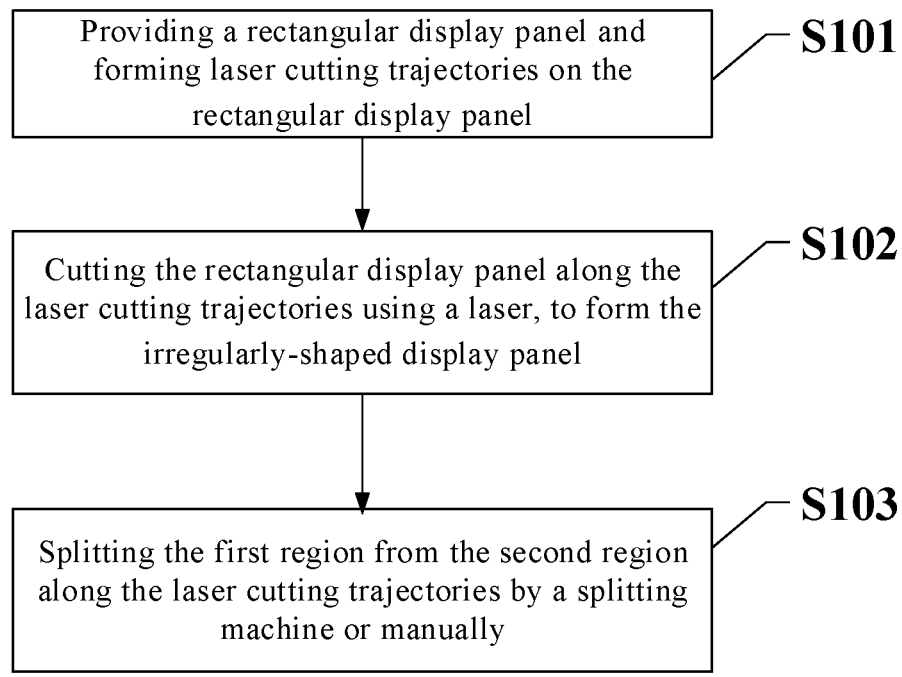
FIG. 13 illustrates another exemplary cutting method for forming an irregularly-shaped display panel consistent with various disclosed embodiments in the present disclosure.

In one embodiment illustrated in FIG. 13, after S102 for cutting the to-be-cut substrate 10 along the laser cutting trajectories 20 using the laser, the cutting method for forming the irregularly-shaped display panel 100 may further include S103—a splitting process. The splitting process S103 may include splitting the first region 61 from the second region 62 along the laser cutting trajectories 20 by a splitting machine or by hands.

In the embodiment of the present disclosure, at least one of the cutting entry point A and the cutting exit point B for each of the laser cutting trajectories 20 may not be located in the edge of the display panel. Correspondingly, after the laser cutting process, the second region 62 of the rectangular display panel 200 may not be detached from the first region 61. The first region 61 may be split from the second region 62 along the laser cutting trajectories 20 by a splitting machine or by hands, to form the irregularly-shaped display panel 100 illustrated in FIG. 2.

In the display panel and display device provided by various embodiments of the present disclosure, for each of the laser cutting trajectories, at least one of the entry point and the out point may not overlap corresponding one of the at least one irregularly-shaped boundary of the irregularly-shaped display panel. Correspondingly, at least one of the entry point and the out point may not pass the edge of the display panel. In the laser cutting process along each of the laser cutting trajectories, the laser spot may not or may rarely pass a portion of the edge of the display panel corresponding to at least one of the cutting entry point and the cutting exit point. A refraction and/or reflection of a path of the laser in the edge region of the irregularly-shaped display panel may be suppressed, and an energy of the laser may not sputter to damage internal devices of the irregularly-shaped display panel. Correspondingly, a good product ratio and a product reliability may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments but may be embodied in other equivalent forms without departing from the scope of the present disclosure, which is determined by the appended claims.

What is claimed is:

1. A display panel, comprising a display region and a non-display region surrounding the display region, wherein:
   the non-display region includes at least one boundary and includes at least one circuit structure;
   the display panel includes a substrate and the substrate includes a base substrate;
   the non-display region includes laser cutting trajectories corresponding to the at least one boundary;
   an orthographic projection of each of the laser cutting trajectories to the base substrate at least partially overlaps an orthographic projection of a corresponding boundary of the at least one boundary to the base substrate;
   each of the laser cutting trajectories includes a cutting entry point and a cutting exit point at two ends thereof;
   neither of an orthographic projection of the cutting entry point nor an orthographic projection of the cutting exit point to the base substrate overlaps with an orthographic projection of two ends of the corresponding boundary of the at least one boundary to the base substrate, wherein the cutting entry point and the cutting exit point are located at different positions and are located away from edges of the non-display region, and the two ends of the corresponding boundary are located at the edges of the non-display region; and
   the laser cutting trajectories are used as a laser cutting path when using a laser to cut the display panel.

2. The display panel according to claim 1, wherein:
   for each of the laser cutting trajectories, both the cutting entry point and the cutting exit point do not overlap the orthographic projection of the corresponding boundary to the base substrate.

3. The display panel according to claim 1, wherein:
   the at least one boundary includes a straight-line boundary, a polyline boundary, an arcuate boundary, or a combination thereof.

4. The display panel according to claim 1, wherein:
for each of the laser cutting trajectories, a minimum distance D1 between the cutting entry point and the corresponding boundary is larger than or equal to 50 µm.

5. The display panel according to claim 1, wherein:
for each of the laser cutting trajectories, a minimum distance D2 between the cutting exit point and the corresponding boundary is larger than or equal to 50 µm.

6. The display panel according to claim 1, wherein:
the substrate includes a first substrate and a second substrate opposite to the first substrate;
the laser cutting trajectories include first laser cutting trajectories on the first substrate and second laser cutting trajectories on the second substrate;
the first laser cutting trajectories and the second laser cutting trajectories are disposed in a one-to-one correspondence; and
an orthographic projection of each of the first laser cutting trajectories to the base substrate coincides with an orthographic projection of corresponding one of the second laser cutting trajectories.

7. The display panel according to claim 6, wherein:
the display panel is a liquid-crystal display panel; and
the first substrate is an array substrate, and the second substrate is a color film substrate; or the first substrate is a color film substrate, and the second substrate is an array substrate.

8. The display panel according to claim 6, wherein:
the display panel is an organic light-emitting display panel; and
the first substrate is an array substrate, and the second substrate is an opposite substrate; or the first substrate is an opposite substrate, and the second substrate is an array substrate.

9. A cutting method for forming a display panel, wherein:
the method comprises:
providing a to-be-cut display panel including a substrate, wherein the substrate includes a base substrate;
forming laser cutting trajectories on the to-be-cut display panel, wherein:
the laser cutting trajectories divide the to-be-cut display panel into a first region and a second region; the first region includes a display region and a non-display region surrounding the display region; the second region locates at a side of the non-display region away from the display region; the non-display region includes at least one boundary; the laser cutting trajectories correspond to the at least one boundary; an orthographic projection of each of the laser cutting trajectories to the base substrate at least partially overlaps an orthographic projection of a corresponding boundary of the at least one boundary to the base substrate; each of the laser cutting trajectories includes a cutting entry point and a cutting exit point at two ends thereof; and for each of the laser cutting trajectories, at least one of the cutting entry point and the cutting exit point does not overlap with a boundary of the display panel and does not overlap the orthographic projection of the corresponding boundary to the base substrate; and
cutting the to-be-cut display panel along the laser cutting trajectories using a laser, to form the display panel in the first region;
the formed display panel comprises a display region and a non-display region surrounding the display region, wherein:
the non-display region includes at least one boundary and includes at least one circuit structure;
the display panel includes a substrate and the substrate includes a base substrate;
the non-display region includes laser cutting trajectories corresponding to the at least one boundary;
an orthographic projection of each of the laser cutting trajectories to the base substrate at least partially overlaps an orthographic projection of a corresponding boundary of the at least one boundary to the base substrate;
each of the laser cutting trajectories includes a cutting entry point and a cutting exit point at two ends thereof;
neither of an orthographic projection of the cutting entry point nor an orthographic projection of the cutting exit point to the base substrate overlaps with an orthographic projection of two ends of the corresponding boundary of the at least one boundary to the base substrate, wherein the cutting entry point and the cutting exit point are located at different positions and are located away from edges of the non-display region, and the two ends of the corresponding boundary are located at the edges of the non-displary region; and
the laser cutting trajectories are used as a laser cutting path when using a laser to cut the display panel.

10. The cutting method according to claim 9, wherein:
the substrate includes a first substrate and a second substrate opposite to the first substrate;
the laser cutting trajectories include first laser cutting trajectories on the first substrate and second laser cutting trajectories on the second substrate;
the first laser cutting trajectories and the second laser cutting trajectories are disposed in a one-to-one correspondence;
an orthographic projection of each of the first laser cutting trajectories to the base substrate coincides with an orthographic projection of corresponding one of the second laser cutting trajectories; and
the process for cutting the to-be-cut display panel along the laser cutting trajectories using the laser includes: cutting the first substrate along the first laser cutting trajectories using the laser and the cutting the second substrate along the second laser cutting trajectories using the laser; or cutting the second substrate along the second laser cutting trajectories using the laser and the cutting the first substrate along the first laser cutting trajectories using the laser.

11. The cutting method according to claim 9, after the process for cutting the to-be-cut display panel along the laser cutting trajectories using the laser, further including a splitting process, wherein:
the splitting process includes splitting the first region from the second region along the laser cutting trajectories by a splitting machine or manually.

* * * * *